United States Patent
Fencl (12)

(10) Patent No.: US 6,423,882 B1
(45) Date of Patent: Jul. 23, 2002

(54) AIRBORNE GAS PHASE SORPTION ENHANCEMENT USING ULTRAVIOLET LIGHT

(75) Inventor: Forrest B. Fencl, Cerritos, CA (US)

(73) Assignee: Steril-Aire, USA, Inc., Cerritos, CA (US)

(*) Notice: Subject to any disclaimer, the term of this patent is extended or adjusted under 35 U.S.C. 154(b) by 0 days.

(21) Appl. No.: 09/666,712

(22) Filed: Sep. 21, 2000

Related U.S. Application Data

(60) Provisional application No. 60/155,319, filed on Sep. 21, 1999.

(51) Int. Cl.[7] .............................. A62D 3/00; B01D 53/00
(52) U.S. Cl. .................. 588/210; 204/157.3; 204/158.2
(58) Field of Search ........................... 204/157.3, 158.2; 588/210

(56) References Cited

FOREIGN PATENT DOCUMENTS

JP          1-236925 A   *   9/1989

OTHER PUBLICATIONS

*Abstracts only.*

* cited by examiner

*Primary Examiner*—Edna Wong
(74) *Attorney, Agent, or Firm*—Arter & Hadden LLP

(57) ABSTRACT

A method and apparatus are disclosed for gas phase sorption in which a sorption device having an inlet is provided in combination with a source of UV light. The UV light is directed at the inlet of the sorption device for the purpose of destroying organic gas phase compounds and the removal of residue, and OH radicals are formed by the UV light proximate the inlet of the sorption device to destroy organic gas phase compounds disposed on and proximate the inlet of the sorption device. The sorption device is reactivated in situ, the single pass efficiency of the sorption device is enhanced, and the mechanical useable service life of the sorption device is enhanced.

20 Claims, 1 Drawing Sheet

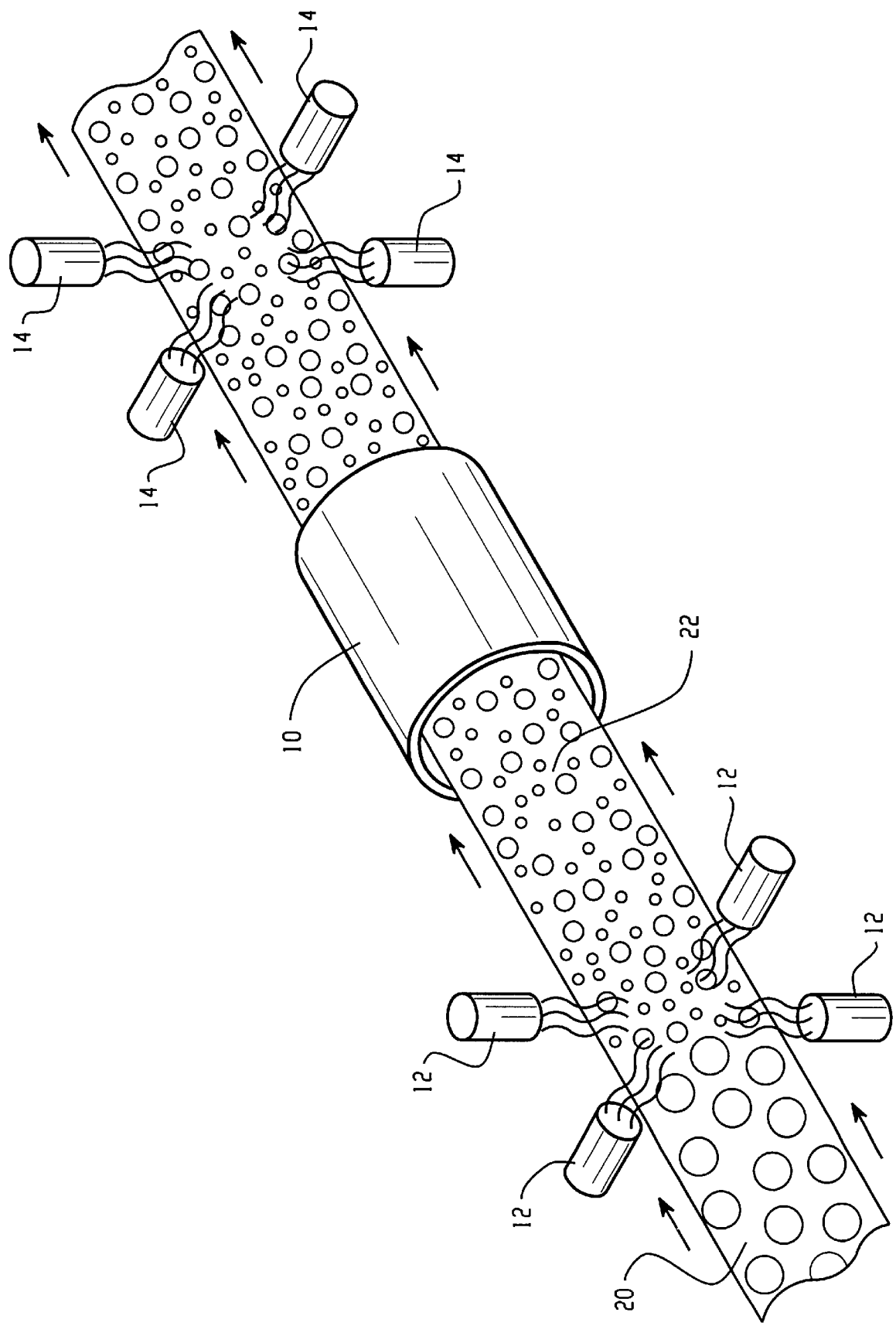

AIRBORNE GAS PHASE SORPTION ENHANCEMENT USING ULTRAVIOLET LIGHT

This application claims the benefit of provisional application Serial No. 60/155,319 filed Sep. 21, 1999.

RELATED APPLICATION INFORMATION

This application is related to application Ser. No. 08/773,643, filed Dec. 24, 1996 entitled "Single-Ended Germicidal Lamp for HVAC Systems," issued Feb. 2, 1999 as U.S. Pat. No. 5,866,076, which is incorporated herein by reference.

This application is related to application Ser. No. 08/803,350 filed Feb. 20, 1997 entitled "Method of UV Distribution in an Air Handling System," issued Oct. 6, 1998 as U.S. Pat. No. 5,817,276, which is incorporated herein by reference.

This application is related to application Ser. No. 09/167,361 filed Oct. 7, 1998 entitled "Reduction of Energy Consumption in a Cooling or Heating System Through UVC irradiation," issued Dec. 5, 2000 as U.S. Pat. No. 6,156,160, which is incorporated herein by reference.

This application is related to application Ser. No. 09/170,361 filed Oct. 13, 1998 entitled "Returning a Heat Exchanger's Efficiency to As New," now U.S. Pat. No. 6,313,470, which is incorporated herein by reference.

This application is related to application Ser. No. 09/173,081 filed Oct. 14, 1998 entitled "Reduction of Pressure Drop of a Cooling or Heating System", issued Jul. 31, 2001 as U.S. Pat. No. 6,267,924.

This application is related to application Ser. No. 09/172,638 filed Oct. 14, 1998 entitled "Control of Health Hazards in an Air Handler", issued Aug. 28, 2001 as U.S. Pat. No. 6,280,686.

This application is related to application Ser. No. 09/172,637 filed Oct. 14, 1998 entitled "Cleaning and Maintaining a Drain Pan in an Air Handling System", issued Jun. 12, 2001 as U.S. Pat. No. 6,245,293.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure, as it appears in the Patent and Trademark Office patent files or records, but otherwise reserves all copyright and trade dress rights whatsoever.

FIELD OF THE INVENTION

The present invention is directed to the field of enhancing the single pass efficiency of a sorption device in removing organic based gas phase contaminants from a mechanically induced air stream, to substantially extend the life of said sorption device by a minimum of 100% and to some indefinite time frame that accelerated testing could not predict.

BACKGROUND OF THE INVENTION

The prior art provides for various sorption devices independently, without enhancements. Stand-alone sorption devices adsorb airborne gas phase contaminants. However, the sorption material must be reactivated or disposed when spent. When not disposed, the spent sorbant is exchanged for used but reactivated material.

The prior art has numerous disadvantages. First, the costs of sorption materials have always been considered a compromise when considering the value of the work done. Second, disposal is more common to lower mass and efficiency sorption devices; however, disposal is now prematurely wasteful and environmentally unsound. Third, exchange services are costly and invasive to the building. The problem here is that the user never knows the origin of the used and reactivated material and therefore what it may have been used for. If not properly and fully reactivated, it may contain dangerous residuals from its previous use. Fourth, expensive additives are used as antimicrobial properties with regard to sorption media. Some states deem many of these treatments of sorption media as hazardous when reactivated or disposed of because the additives can leach out.

There are other devices that achieve portions of the result of the invention. Most are photo-catalytic processes that incorporate photo reactive substrates such as titanium dioxide and an UV frequency(s) to catalytically oxidize gas phase organic compounds. These devices are far more expensive to purchase and operate, and currently require significantly more air horsepower (energy) to treat a air stream. There is also some question as to the disposal requirements and procedures for their spent materials.

SUMMARY OF THE INVENTION

In view of the difficulties and drawbacks associated with previous type systems, there is therefore a need for a sorption system to enhance the performance and extend the usable life of gas phase sorption materials for all customers who use them.

There is also a need for a sorption system that is more efficient and economical to operate.

There is also a need for a sorption system that provides an increase in the single pass removal efficiency of any organic gas phase sorption device.

There is also a need for a sorption system that provides a reduction in the mass and therefore the pressure drop for a given single pass removal efficiency of an organic gas phase sorption device.

There is also a need for a sorption system that provides an extension of the usable life of any organic gas phase sorption device.

There is also a need for a sorption system that provides for maintenance of the maximum single pass efficiency of any sorption device during the sorption materials' usable life.

There is also a need for a sorption system that provides degradation of collected organic matter at the solid, molecular and atomic level that impairs macro, meso and micropore adsorption properties of common sorption materials.

There is also a need for a sorption system that provides creation of organic compound reactors, for example (OH—) from water vapor, etc. to help break down organic gases and substances.

These needs and others are satisfied by the apparatus for gas phase sorption in which a sorption device having an inlet is provided in combination with a source of UV light. The UV light is directed at the inlet of the sorption device for the purpose of destroying organic gas phase compounds and the removal of residue, and OH— radicals are formed by the UV light proximate the inlet of the sorption device to destroy organic gas phase compounds disposed on and proximate the inlet of the sorption device. The sorption device is reactivated in situ, the single pass efficiency of the sorption device is enhanced, and the mechanical useable service life of the sorption device is enhanced.

As will be realized, the invention is capable of other and different embodiments and its several details are capable of modifications in various respects, all without departing from the invention. Accordingly, the drawing and description are to be regarded as illustrative and not restrictive.

BRIEF DESCRIPTION OF THE DRAWINGS

FIG. 1 depicts an exemplary embodiment of a gas phase sorption device according to the present invention.

DETAILED DESCRIPTION OF THE INVENTION

Throughout this description, the preferred embodiment and examples shown should be considered as exemplars, rather than limitations on the apparatus and methods of the present invention.

The market for embodiments of the invention is quite diverse and includes residential and commercial structures to industrial and institutional facilities. It also includes modes of transportation and laboratories, anywhere sorption materials are in use. While the benefits of sorption are well known and understood, the expense of ownership and the inconvenience of service are also well known and understood. This limits the number of first fit applications and especially their continued use. The individual products of the invention are proven and long standing, the combining of these products is not.

As shown in FIG. 1, a sorption (removal) device 10 with minimal to high single pass efficiency on gas phase contaminants, in the invention, is combined with one or more ultraviolet emitter light sources 12, 14. The sources are positioned upstream 12, downstream 14, (or both) of the sorption device 10 in the direction of airflow. In one embodiment, the emitter's energy is suitably directed to the surface of the sorption materials. The greatest efficiency and service life of the sorption material is attained when the sorption materials are directly irradiated.

As gas phase contaminated air passes by the UV emitters 12, 14 (preferably in the 200–300 nanometer range), ionization of that gas compounds occurs. The rate (activity, amount) of ionization is relative to the energy generated and subsequently absorbed by a compound or compounds. The molecular bonds of individual gas molecules are broken degrading them to less complicated compounds or to individual molecules as well as to individual atoms of the original structure. The process reduces the amount of gaseous compounds reaching the sorption material of the device 10 and is not catalytic. Two different but related events result. The single-pass efficiency of the sorption device increases and the usable life of the sorption material increases.

From the UV light an additional benefit occurs from the formation of a hydroxyl radical comprises of a single oxygen and hydrogen atom OH—. While benign to many substances and animals, its existence in proximity to volatile organic compounds (VOCs), as an example, results in these compounds engaging, combining and reacting with the OH— radical. The predominant result is the formation of simple carbon dioxide and water vapor. While this was evident in an atmosphere, it is now evident in the sorption material of the device 10. The gas phase adsorption phenomena occurring in the macro, meso and micro pores of the sorption material of the device 10 will include the OH— radical. The importance here can not be overstated; the adsorption of both VOC and OH— allows the sorption material to desorb much if not all of its adsorbed compounds in the form of $CO_2$ and water vapor. Both the water vapor irradiated and adsorbed from the air stream and that which is created within the sorption material enhances the production of OH—. This increases the production of $CO_2$ and water vapor and the cycle continues. This continuing process can extend the sorption material's usable life indefinitely. This latter event is suitable catalytic by some definition but is not commonly described as such in function.

A gas discharge UV device or devices 12, 14, of a number and length suitable to cover the cross sectional width and/or height of the sorption device, is placed at various but strategic distances upstream of the sorption bed (emitters 12) in order for a specific amount of UV energy to properly treat the air stream and strike the functional majority of the air entering side of the sorption material. The number and location of the UV devices 12 and the UV energy required is therefore dependent on the air volume, concentrations and type of gas phase contaminants and their desired destruction as well as the construction of the sorption device 10, its required adsorption rate and its anticipated usable life.

As gas phase contaminated air 20 approaches the UV devices 12, 14, the ionization radiation produced by a predetermined amount of UV electrically disrupts the molecular bonds of the gases reducing them to less complex compounds, molecules and/or atoms 22. This process reduces the mass of the gas phase contaminants approaching the sorption device 10. This reduced mass then increases the measurable single pass efficiency of the sorption device 10 and results in an increase of the sorption device's usable life.

A second phenomenon occurs when the UV ionizes any innate water vapor in the air stream and the boundary layer relative humidity of the sorption material. The result is the formation of OH— molecules, which has both positive effects on the airborne volatile gas phase contaminants and those that are in the process of adsorption and condensation. The OH blends and interacts with volatile organic compound gases, reducing their mass and forming essentially harmless compounds such as $CO_2$ and residual water, which desorbs and evaporates respectively from the sorption material. Depending on the concentration per unit volume of gas phase contaminants approaching a sorption device, the mass of its sorption material, the available airborne and boundary layer water and the amount of UV energy applied, a given sorption device 10 can stay in service for an indefinite period of time. The UV lamp in combination with the OH— radical being present eliminates the need for antimicrobial treatment of the sorption media.

In an alternative embodiment, a minimum of 50% of the results demonstrated with the UV lights located upstream of a sorption bed can often be obtained with the lights located downstream only (emitters 14 of FIG. 1). The addition of UV lights 14 located downstream provides supplementary polishing of the air after the sorption device 10 by further reducing any residual concentration per unit volume of gas phase contaminants. The addition of UV lights 14 located downstream provides the distinct advantage of additional airborne destruction of harmful airborne microbes. The addition of UV lights 14 located downstream of the sorption device will further add to its life by reducing the gas phase mass of the returned air.

The invention provides many advantages over the prior art. If germicidal UV frequencies are utilized, an added advantage is the destruction of airborne microorganisms. The precursory destruction or partial breakdown of gas phase contaminants results which increases single pass "removal" efficiency. A lower time weighted average concentration per unit volume of organic gas phase contaminants is found in the subsequent air stream. Increased sorption material efficiency and life results through the degradation of impinged organic solids in the sorption materials macropore structure from direct irradiation with UV light. Increased sorption material life results through the evaporation and desorption of residual water vapor and $CO_2$ over an indefinite period of time. Less sorption mass is required for similar single pass efficiencies. Lower pressure drop results for a similar single pass efficiency. Lower energy costs result for similar single pass efficiencies. Significantly reduced first and replacement costs result for common sorption materials. Reduced maintenance (labor) is required for most sorption devices. Ventilation system downtime is reduced. Substantial cost savings are realized for the sorption media user. Higher single pass efficiencies are realized out of a standard sorption device. A longer to an indefinite service life is realized from a standard sorption device. The simultaneous destruction of airborne microorganisms occurs.

As shown in the figure, UV emitters may be located either/or up and downstream or both of the sorption device for even greater single pass removal efficiencies of gas phase contaminants. UV emitters placed downstream only of the sorption device results in a somewhat lower overall benefit. The invention was developed to enhance the performance and extend the usable life of gas phase sorption materials for all customers who use them. A sorption material user could save from $1.00 to $20.00 annually for each pound of sorption material in use.

The invention provides an increase in the single pass removal efficiency of any organic gas phase sorption device. The invention provides a reduction in the mass and therefore the pressure drop for a given single pass removal efficiency of an organic gas phase sorption device. The invention provides an extension of the usable life of any organic gas phase sorption device. The invention provides for maintenance of the maximum single pass efficiency of any sorption device during the sorption materials' usable life. The invention provides degradation of collected organic matter at the solid, molecular and atomic level that impairs macro, meso and micropore adsorption properties of common sorption materials. The invention provides creation of organic compound reactors ($OH^e$) from water vapor, etc. to help break down organic gases and substances. The invention therefore provides synergy from the combination of two different HVAC related air conditioning technologies that result in another with an affect greater than the sum of the two.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

What is claimed is:

1. A method of gas phase sorption comprising:
   providing a sorption device having an inlet and an outlet
   directing UV light to at least one of the inlet and the outlet of the sorption device for the purpose of destroying organic gas phase compounds and the removal of residue;
   forming $OH^-$ radicals by the UV light proximate to the respective at least one of the inlet and outlet of the sorption device to destroy organic gas phase compounds disposed on and proximate to the at least one of the inlet and outlet of the sorption device,
   whereby the sorption device is reactivated in situ,
   the single pass efficiency of the sorption device is enhanced, and
   the mechanical useable service life of the sorption device is enhanced.

2. The method of claim 1 wherein the step of directing UV light is performed upstream the inlet of the sorption device.

3. The method of claim 1 wherein the step of directing UV light is performed downstream the outlet of the sorption device.

4. The method of claim 1 wherein the step of directing UV light comprises emitting in germicidal frequencies to destroy airborne microorganisms.

5. The method of claim 1 wherein the step of directing UV light comprises emitting in a range of between 200–300 nanometers.

6. The method of claim 1 wherein the step of directing UV light comprises a directing from a plurality of UV sources.

7. The method of claim 1 wherein the step of directing light comprises covering at least one of a cross sectional width and height of the sorption device.

8. A method of gas phase sorption, comprising:
   providing a sorption device having an inlet and an outlet,
   directing UV light to the inlet of the sorption device for the purpose of destroying organic gas phase compounds and the removal of residue,
   forming $OH^-$ radicals by the UV light proximate to the inlet of the sorption device,
   whereby the sorption device is reactivated in situ,
   the single pass efficiency of the sorption device is enhanced, and
   the mechanical useable service life of the sorption device is enhanced.

9. The method of claim 8 wherein the step of directing UV light comprises emitting in germicidal frequencies to destroy airborne microorganisms.

10. The method of claim 8 wherein the step of directing UV light comprises emitting in a range of between 200–300 nanometers.

11. The method of claim 8 wherein the step of directing UV light comprises a directing from a plurality of UV sources.

12. The method of claim 8 wherein the step of directing light comprises covering at least one of a cross section width and height of the sorption device.

13. A method of gas phase sorption, comprising:
    providing a sorption device having an inlet and an outlet,
    directing UV light to the outlet of the sorption device for the purpose of destroying organic gas phase compounds and the removal of residue,
    forming $OH^-$ radicals by the UV light proximate to the outlet of the sorption device,
    whereby the sorption device is reactivated in situ,
    the single pass efficiency of the sorption device is enhanced, and
    the mechanical useable service life of the sorption device is enhanced.

14. The method of claim 13 wherein the step of directing UV light comprises emitting in germicidal frequencies to destroy airborne microorganisms.

15. The method of claim 13 wherein the step of directing UV light comprises emitting in a range of between 200–300 nanometers.

16. The method of claim 13 wherein the step of directing UV light comprises a directing from a plurality of UV sources.

17. The method of claim 13 wherein the step of directing light comprises covering at least one of a cross sectional width and height of the sorption device.

18. The method of claim 13 wherein the directing step further comprises directing UV light to the inlet of the sorption device to destroy organic gas compounds disposed on and proximate to the inlet of the sorption devices.

19. The method of claim 18 wherein the step of directing UV light comprises emitting in germicidal frequencies to destroy airborne microorganisms.

20. The method of claim 18 wherein the step of directing UV light comprises emitting in a range of between 200–300 nanometers.

* * * * *